US006782784B2

(12) United States Patent
Sato et al.

(10) Patent No.: US 6,782,784 B2
(45) Date of Patent: Aug. 31, 2004

(54) PAPER CUTTING DEVICE

(75) Inventors: Hitoshi Sato, Tokyo (JP); Shinichi Miyashita, Yamanashi-ken (JP)

(73) Assignee: Japan CBM Corporation, Tokyo (JP)

( * ) Notice: Subject to any disclaimer, the term of this patent is extended or adjusted under 35 U.S.C. 154(b) by 0 days.

(21) Appl. No.: 09/938,854

(22) Filed: Aug. 27, 2001

(65) Prior Publication Data

US 2002/0025897 A1 Feb. 28, 2002

(30) Foreign Application Priority Data

Aug. 28, 2000 (JP) ....................................... 2000-258267

(51) Int. Cl.$^{7}$ ................................................ B23D 19/00

(52) U.S. Cl. .............................. 83/485; 83/487; 83/614

(58) Field of Search .......................... 83/614, 485, 487, 83/582, 698.91, 699.21, 698.71, 698.11, 578

(56) References Cited

U.S. PATENT DOCUMENTS

| | | | | | |
|---|---|---|---|---|---|
| 3,476,044 | A | * | 11/1969 | Wassermann | 101/93.15 |
| 4,084,681 | A | * | 4/1978 | Heinzl et al. | 83/308 |
| 4,372,698 | A | * | 2/1983 | Matsushima | 400/320 |
| 4,452,542 | A | * | 6/1984 | Akazawa | 400/175 |
| 4,515,053 | A | | 5/1985 | DuBois | |
| 4,693,151 | A | * | 9/1987 | Goubeaux et al. | 83/23 |
| 4,795,285 | A | * | 1/1989 | Moriya et al. | 400/320 |
| 5,158,379 | A | * | 10/1992 | Moriya et al. | 400/279 |
| 5,168,786 | A | * | 12/1992 | Huggins et al. | 83/308 |
| 5,787,778 | A | * | 8/1998 | Saito et al. | 83/383 |
| 5,868,056 | A | * | 2/1999 | Pfarr et al. | 83/177 |
| 5,954,439 | A | * | 9/1999 | Brannan et al. | 400/621 |
| 6,026,724 | A | * | 2/2000 | Hagen et al. | 83/455 |
| 6,076,446 | A | | 6/2000 | Onishi | |
| 6,263,774 | B1 | * | 7/2001 | Rogness et al. | 83/382 |
| 6,315,474 | B1 | * | 11/2001 | Giles et al. | 346/24 |

FOREIGN PATENT DOCUMENTS

| | | |
|---|---|---|
| EP | 0579477 | 1/1994 |
| EP | 0813935 | 12/1997 |

* cited by examiner

*Primary Examiner*—Stephen F. Gerrity
*Assistant Examiner*—Louis Tran
(74) *Attorney, Agent, or Firm*—Dennison, Schultz, Dougherty & MacDonald

(57) ABSTRACT

A straight fixed cutter is mounted on a frame, a movable cutter carrier slidably supported on the frame to be moved along the fixed cutter. A movable cutter having a disc shape is rotatably mounted on the carrier, and contacted with the fixed cutter. A movable cutter rotating roller is rotatably mounted on the movable cutter carrier and resiliently contacted with the fixed cutter. An endless belt is provided in the frame along the fixed cutter, and connected with the movable cutter carrier. The movable cutter carrier is moved by the endless belt, and the movable cutter is rotated along the fixed cutter to cut a paper sheet mounted on the fixed cutter.

6 Claims, 12 Drawing Sheets

PAPER CUTTING DEVICE

BACKGROUND OF THE INVENTION

The present invention relates to a paper cutting device for a printer, ticket vendor and others.

As a conventional paper cutting device, there is known a device in which a movable cutter having a disc shape is rolled on a straight fixed cutter so as to cut a paper sheet.

FIGS. 16 and 17 show the conventional paper cutting device. An elongated fixed cutter 102 is in a frame 101, and a movable cutter disc 103 is rotatably supported in a cutter carrier 104 and mounted on the fixed cutter 102. The cutter carrier 104 is slidably mounted on a carrier feed shaft 105 having a feeding spiral groove 105*a* and a returning reverse spiral groove 105*b*.

The underside of the cutter carrier 104 contacts with an end of a detector lever 107 at the illustrated home position. The other end of the detector lever 107 is connected with a detector 106. The detector 106 generates a signal which is applied to a control circuit (not shown) for informing that the cutter carrier 104 is located at the home position.

Referring to FIG. 17, a gear 112 secured to the left end of the feed shaft 105 is connected to an output shaft 108*a* of a carrier feeding motor 108 through gears 111, 110 and a gear 109 secured to the output shaft 108*a*.

When a paper sheet is cut, the paper sheet is put on the fixed cutter 102, and the motor 108 is operated to rotate the carrier feed shaft 105. At the home position, the cutter carrier 104 engages with the feeding groove 105*a*. Consequently, the cutter carrier 104 is fed to the right to rotate the movable cutter disc 103. Thus the paper sheet is cut by the movable cutter disc 103 and the fixed cutter 102.

When the cutter carrier 104 arrives the right end, the cutter carrier 104 is engaged with the returning groove 105*b*. Thus, the cutter carrier 104 is fed to the left. When the cutter carrier 104 arrives the home position, the motor 108 is stopped by the operation of the control circuit dependent on the operation of the detector lever 107 and the detector 106.

In the conventional device, the cutter carrier 104 slides on the feeding groove 105*a* or the returning groove 105*b* of the feeding shaft 105 during the cutting operation. Consequently, there is large frictional resistance between the cutter carrier 104 and the feeding shaft 105, thereby increasing the load on the carrier feeding motor 108 and generating large noises. In addition, it is necessary to perform a number of processing steps to manufacture the feeding groove and the returning groove of the feeding shaft 105, which causes the manufacturing cost to increase.

SUMMARY OF THE INVENTION

An object of the present invention is to provide a paper cutting device which is small in frictional resistance and in noise and which may be manufactured at a low cost.

According to the present invention, there is provided a paper cutting device comprising a frame, a straight fixed cutter mounted on the frame, a movable cutting carrier slidably supported on the frame to be moved along the fixed cutter, a movable cutter having a disc shape and rotatably mounted on the carrier, and contacted with the fixed cutter at a side surface thereof, a movable cutter rotating roller rotatably mounted on the movable cutter carrier and resiliently contacted with the movable cutter at a side surface thereof and with the fixed cutter, a carrier feeding endless belt provided in the frame along the fixed cutter, a carrier connecting member operatively connecting the movable cutter carrier with the endless belt, a belt driving motor, a power transmitting device for transmitting the power of the motor to the endless belt for driving the endless belt, whereby the movable cutter carrier is moved by the endless belt, and the movable cutter is rotated along the fixed cutter so as to cut a paper sheet mounted on the fixed cutter.

The device further comprises a shaft mounted on the movable cutter carrier, a movable cutter cylindrical holder mounted on the shaft, and a holding member mounted on the movable cutter cylindrical holder, the movable cutter rotating roller being mounted on the holding member.

A fixing projection is formed on a peripheral portion of the belt for connecting the carrier with the belt.

The movable cutter rotating roller urges the movable cutter to a flange formed on the movable cutter cylindrical holder to hold the movable cutter.

The carrier connecting member has a cylindrical projection slidably engaged with a vertical elongated hole formed in the movable cutter carrier, and engaged with the fixing projection on the belt.

A spring is provided between an inside wall of the carrier and the movable cutter cylindrical holder for pressing the movable cutter against the fixed cutter.

These and other objects and features of the present invention will become more apparent from the following detailed description with reference to the accompanying drawings.

DETAILED DESCRIPTION OF THE PREFERRED EMBODIMENTS

Figure 1:
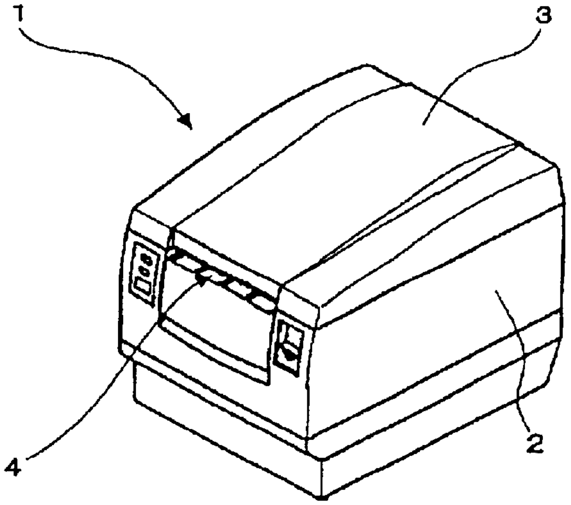
FIG. 1 is a perspective view of a printer employing a paper cutting device of the present invention.

Referring to FIG. 1, a printer 1 has a printer body 2 and a cover 3 rotatably mounted on the printer body 2. A paper discharge opening 4 is formed between the printer body 2 and the cover 3.

Figure 2:
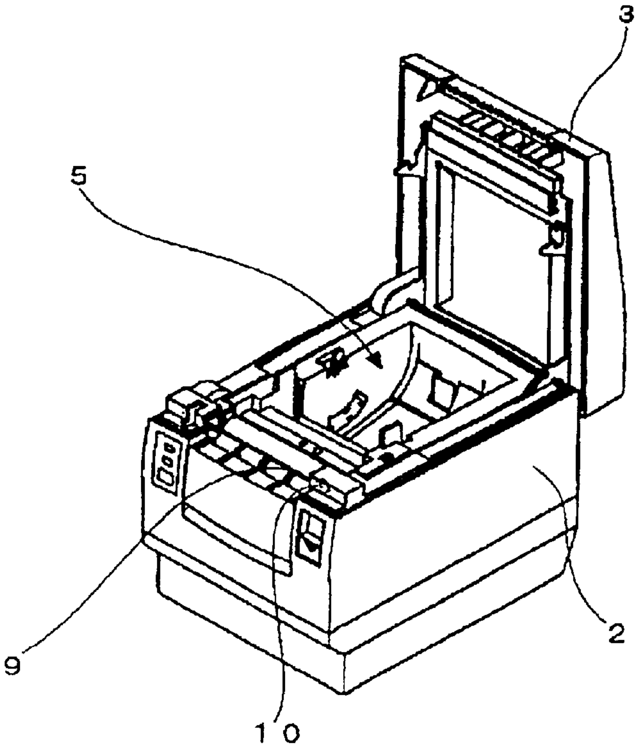
FIG. 2 is a perspective view showing the inside of the printer of FIG. 1.
Figure 3:
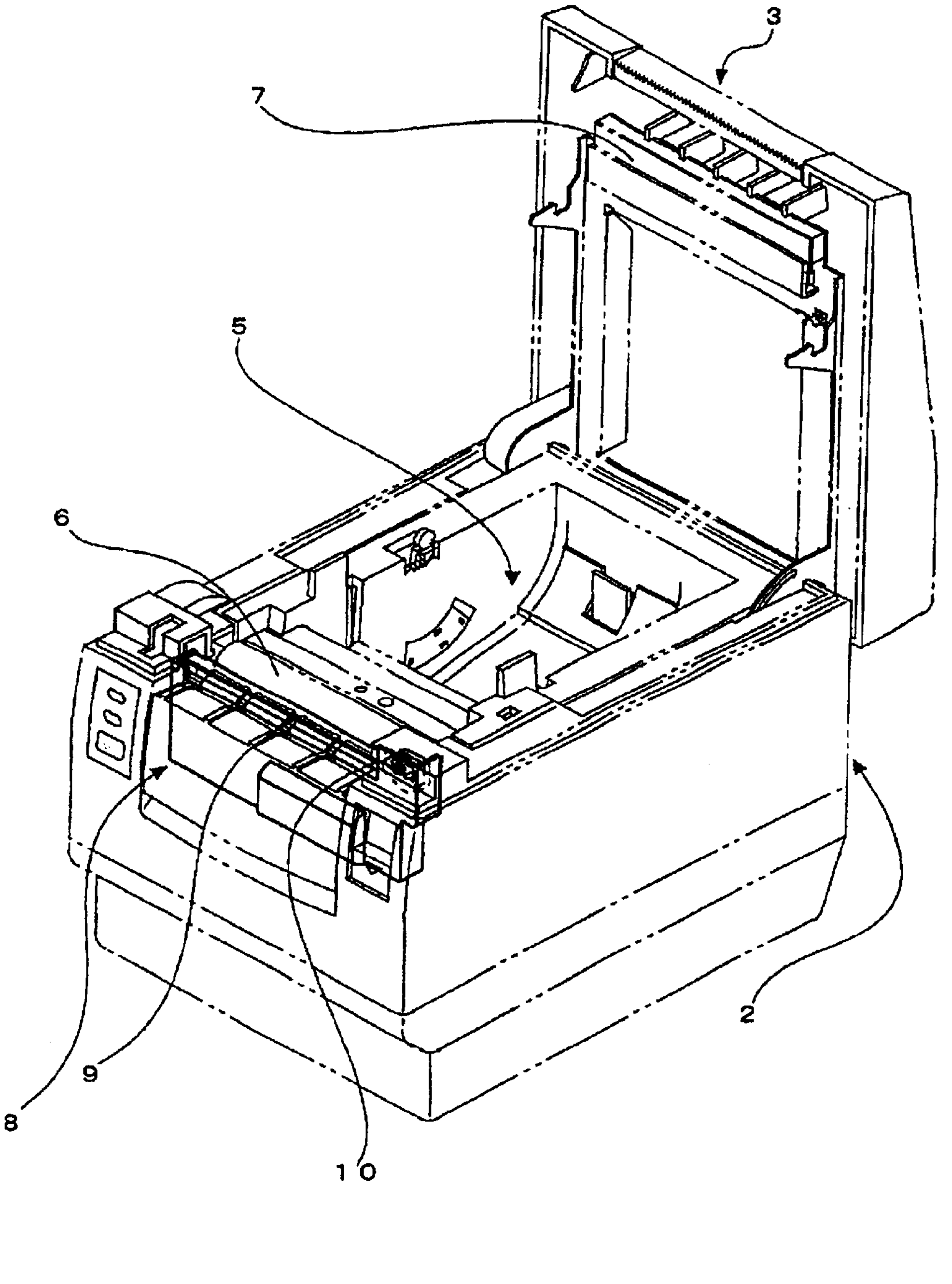
FIG. 3 is an enlarged perspective view of the printer shown in FIG. 2.

Referring to FIGS. 2 and 3, a paper housing portion 5 is provide in the printer body 2. A paper cutting device 8 having a fixed cutter 9 and a movable cutter 10 is provided inside the paper discharge opening 4.

There is provided a platen roller 6 inside the paper cutting device 8. The fixed cutter 9 is parallel with the platen roller 6. The movable cutter 10 has an annular shape as described hereinafter and is disposed at a right side of the paper discharge opening 4, in the condition that the movable cutter is pressed against the fixed cutter 9. A print head 7 is provided inside the cover 3.

Figure 4:
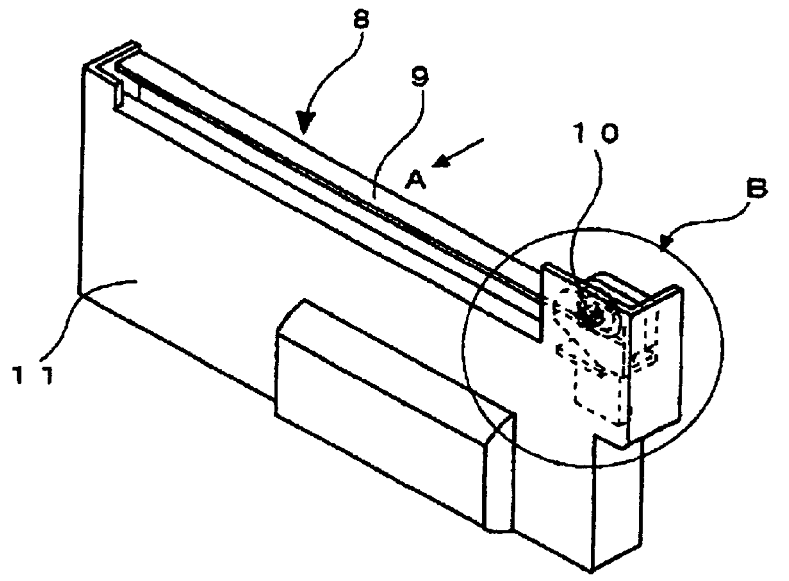
FIG. 4 is an enlarged perspective view of a part of FIG. 3.
Figure 5:
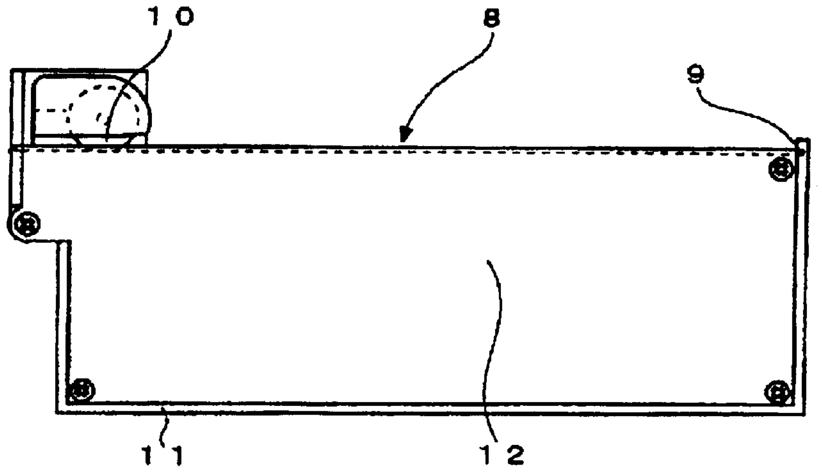
FIG. 5 is a side view as viewed from the arrow A of FIG. 4.

Referring to FIGS. 4 and 5, the fixed cutter 9 is secured to a frame 11 at an upper longitudinal side. The movable cutter 10 is disposed at a home position at the right end position of the frame 11 in FIG. 4.

Figure 6:
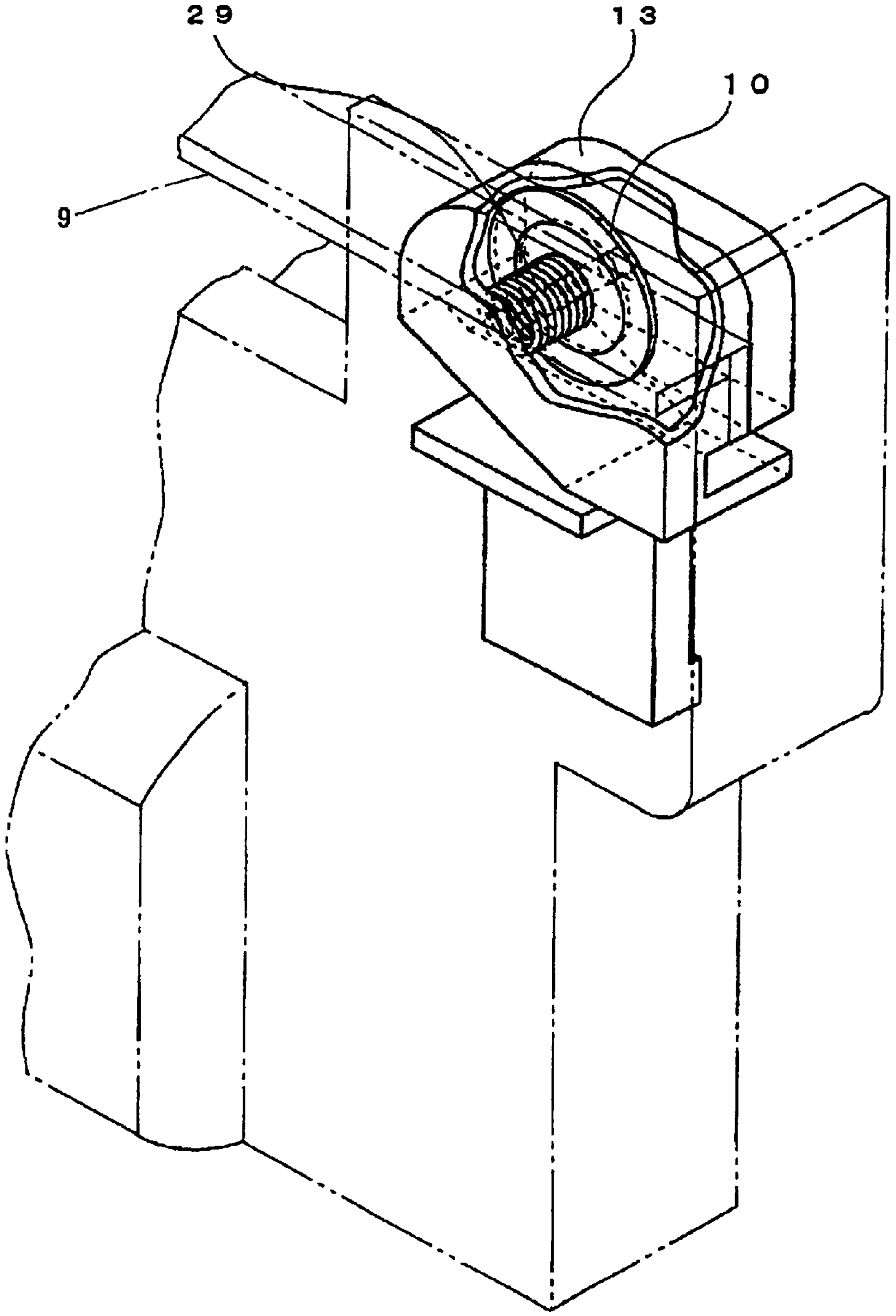
FIG. 6 is an enlarged perspective view of a part B of FIG. 4.

Referring to FIG. 6, a movable cutter carrier 13 is mounted on the frame 11 so as to be reciprocated in the longitudinal direction of the frame. The movable cutter 10 is rotatably mounted on the movable cutter carrier 13 and pressed against the fixed cutter 9 by a spring 29.

Figure 7:
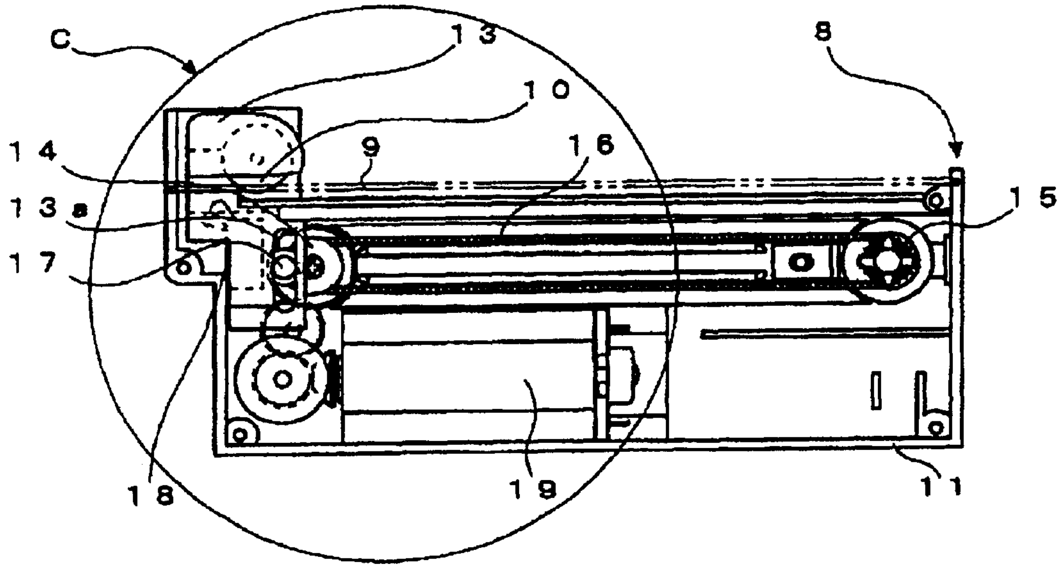
FIG. 7 is a front view of the device.
Figure 8:
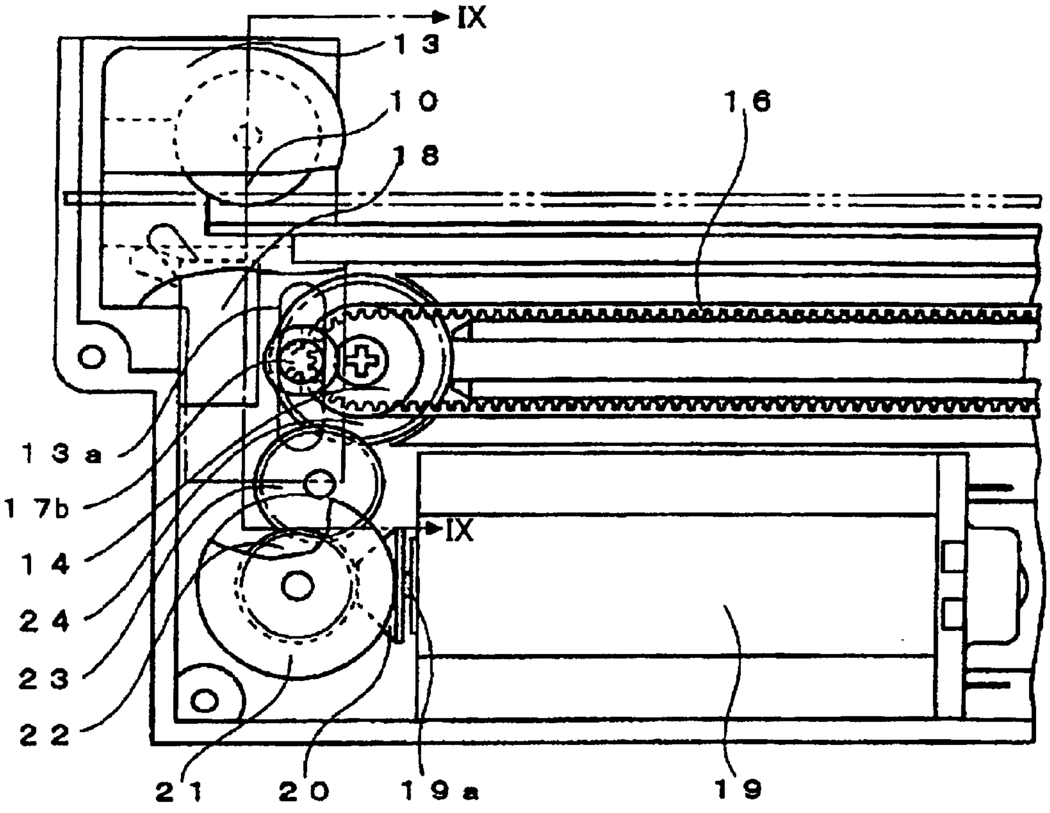
FIG. 8 is an enlarged view of a part C of FIG. 7.

Referring to FIGS. 7 and 8, a first pulley 14 and a second pulley 15, each having teeth on the periphery thereof, are rotatably mounted on the frame 11. A carrier feeding endless timing belt 16 is engaged with the first and second pulleys 14 and 15. A carrier connecting member 17 is attached to the belt 16 for connecting the carrier 13 with the belt 16. The carrier connecting member 17 is slidably inserted in an elongated vertical hole 13*a* of the carrier 13.

A belt driving motor 19 is mounted in the frame 11. A sensor 18 is provided on the frame 11 for detecting the movable cutter carrier 13 at the home position.

As shown in FIG. 8, a pulley gear 24 is secured to the first pulley 14. An output shaft 19*a* of the motor 19 is connected to a first gear 22 through bevel gears 20 and 21. The first gear 22 is connected to the pulley gear 24 through a second gear 23.

Figure 9:
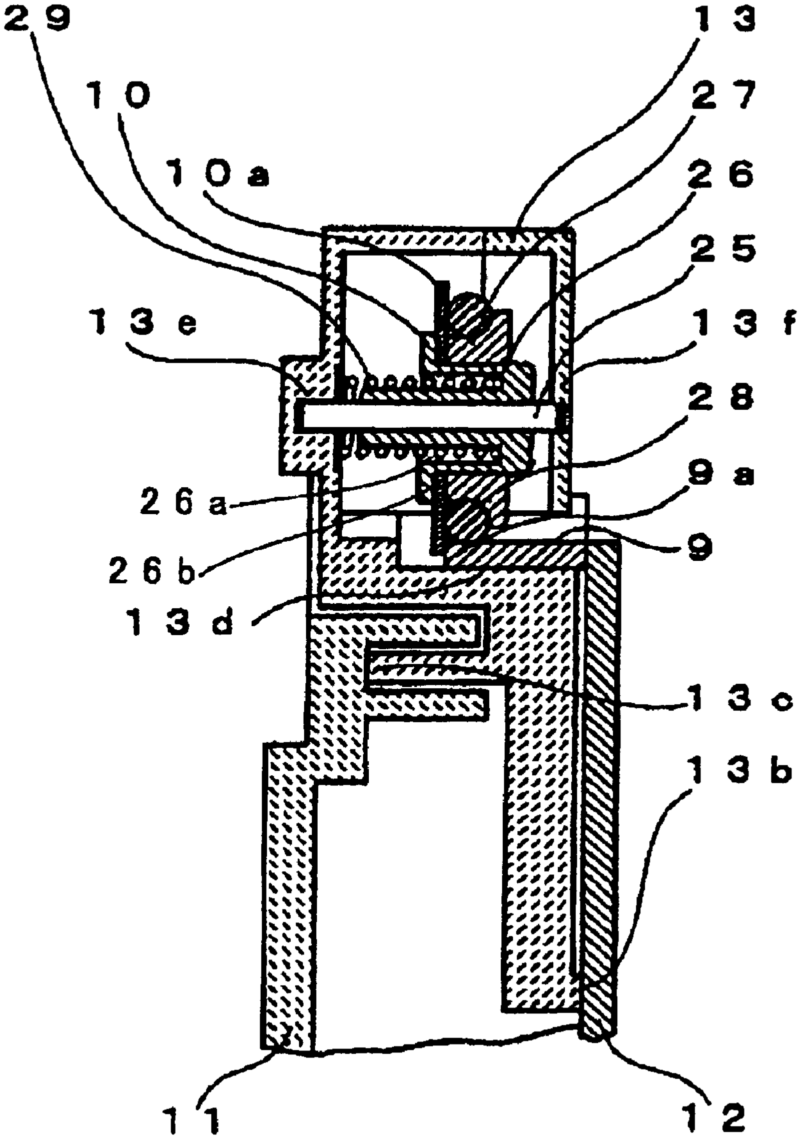
FIG. 9 is a sectional view taken along a line IX—IX of FIG. 8.

Referring to FIG. 9, the fixed cutter 9 is engaged in a groove (not shown) formed in the frame 11 and held by a cover 12. On the fixed cutter 9, a straight blade 9*a* is formed. On the movable cutter carrier 13, a first sliding portion 13*b*, second sliding portion 13*c*, and a third sliding portion 13*d* are formed. The first sliding portion 13*b* slidably contacts with the inside wall of the cover 12, the second sliding portion 13*c* slidably contacts with the frame 11, and the third sliding portion 13*d* slidably contacts with the fixed cutter 9 so that the movable cutter carrier 13 is slidably held by the frame 11 and the cover 12.

Furthermore, shaft supporting holes 13*e* and 13*f* are formed in the carrier 13, and a movable cutter shaft 25 is rotatably mounted in the holes. On the movable cutter shaft 25, a movable cutter cylindrical holder 26 is mounted. On the movable cutter holder 26, the annular movable cutter 10 having a peripheral edge 10*a* and a cylindrical holding member 27 are force fitted. A movable cutter rotating roller 28 made of resilient material such as rubber is held in an annular groove formed on the cylindrical holding member 27 to be pressed against the side of the movable cutter 10, thereby retaining the movable cutter 10.

The movable cutter rotating roller 28 is pressed against the fixed cutter 9 so that when the movable cutter carrier 13 is moved, the movable cutter rotating roller 28 is rotated, thereby rotating the movable cutter 10.

A spring 29 is provided between the inside wall of the carrier 13 and a cylindrical hole 26*a* of the movable cutter holder 26 so as to urge the holder to the right. Thus, a flange 26*b* of the holder 26 pushes the movable cutter 10 to press the edge 10*a* against the fixed cutter 9.

Figure 12A:
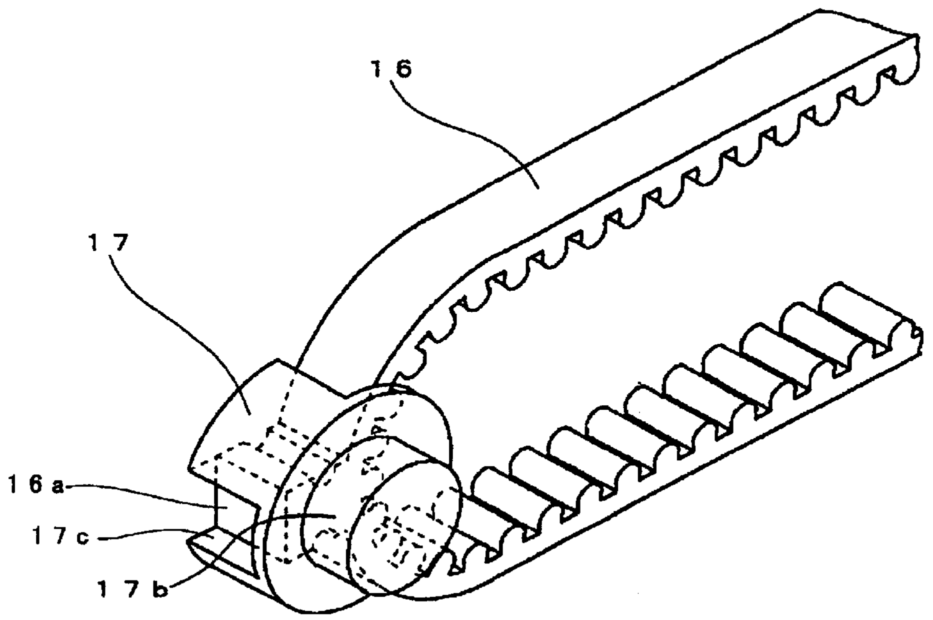
FIGS. 12*a* and 13 are perspective views showing conditions of a carrier belt.
Figure 12B:
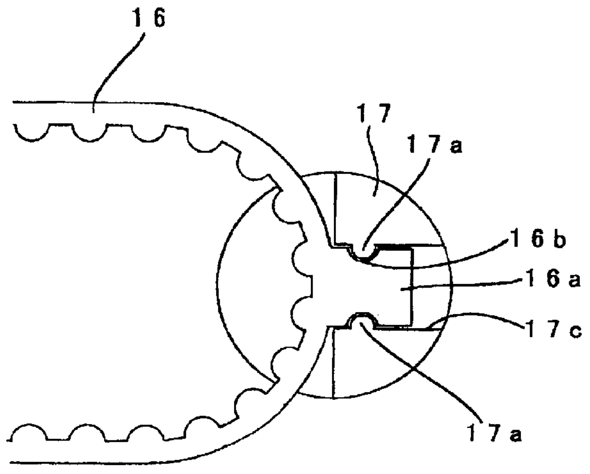
FIG. 12*b* is a back side view of the carrier belt.
Figure 12C:
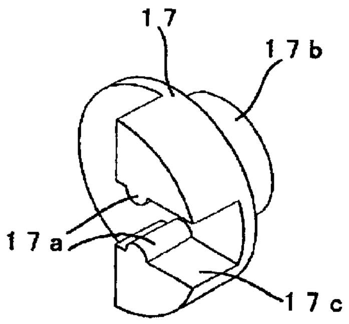
FIG. 12*c* is a perspective view of a carrier connecting member.
Figure 13:
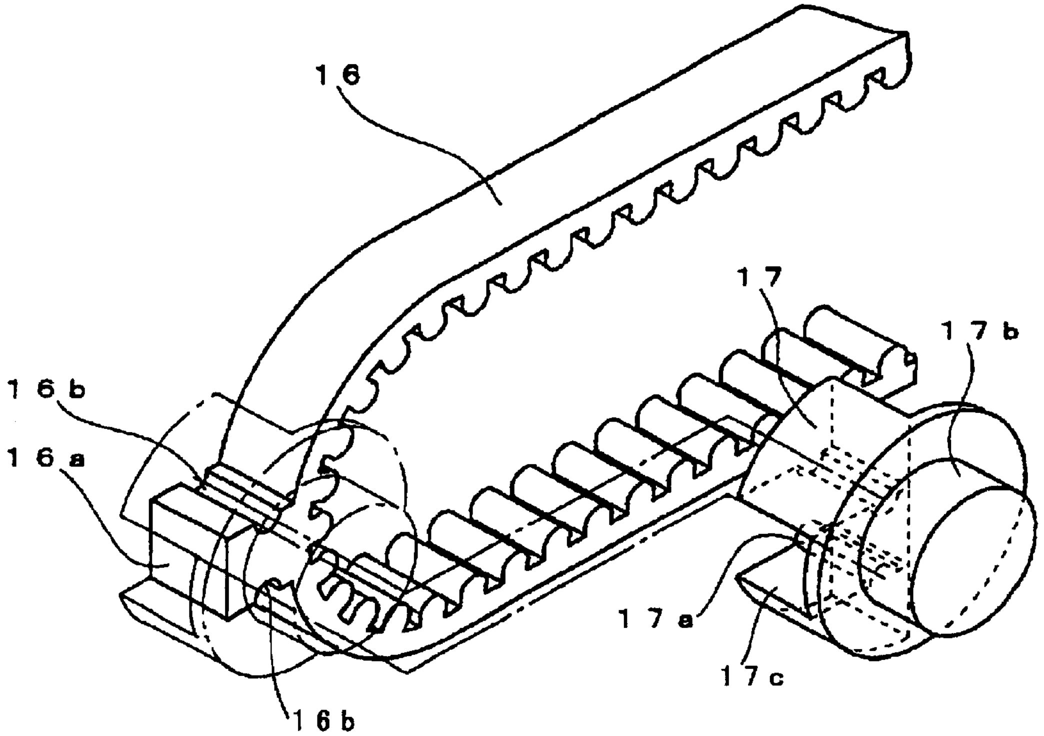

Referring to FIG. 12*a* to FIG. 13, on the carrier feeding belt 16, a carrier connecting member fixing projection 16*a* is integrally formed at a peripheral portion of the belt to be outwardly projected. A pair of recesses 16*b* are provided on both sides of the projection 16*a*.

On the other hand, the carrier connecting member 17 has a cylindrical projection 17*b* to be engaged with the vertical elongated hole 13*a* of the movable cutter carrier 13, a recess 17*c* to be engaged with the fixing projection 16*a*, and a pair of projections 17*a* to be engaged with the recesses 16*b* of the projection 16*a* as shown in FIG. 12*b*.

Figure 10:
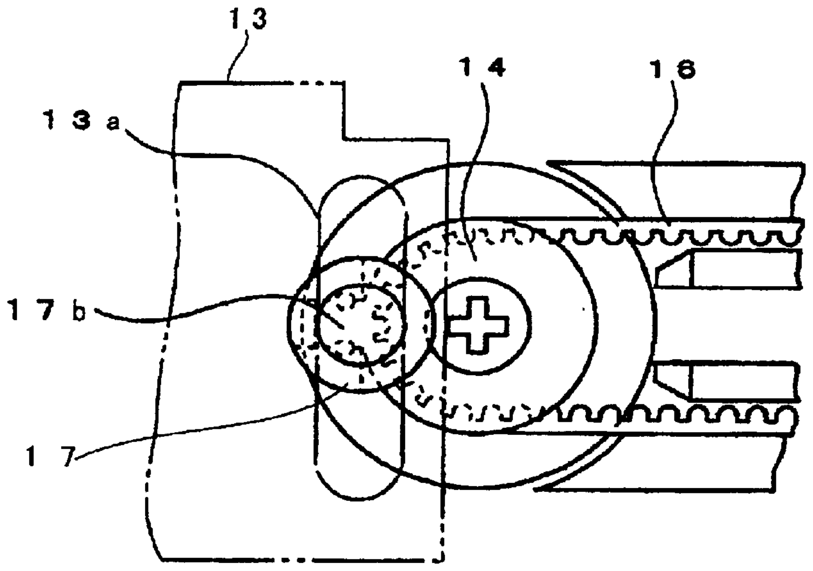
FIGS. 10 and 11 are enlarged views of a part of FIG. 8.
Figure 11:
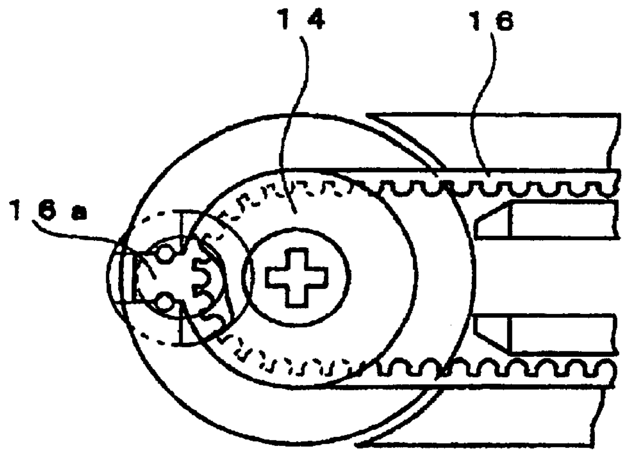

As shown in FIGS. 12*a* and 12*b*, the carrier connecting member 17 is fixed to the fixing projection 16*a* of the belt 16 by engaging the corresponding opposite portions. The elongated hole 13*a* of the carrier 13 is slidably engaged in the projection 17*b* of the carrier connecting member 17 as shown in FIGS. 8 and 10.

Figure 14:
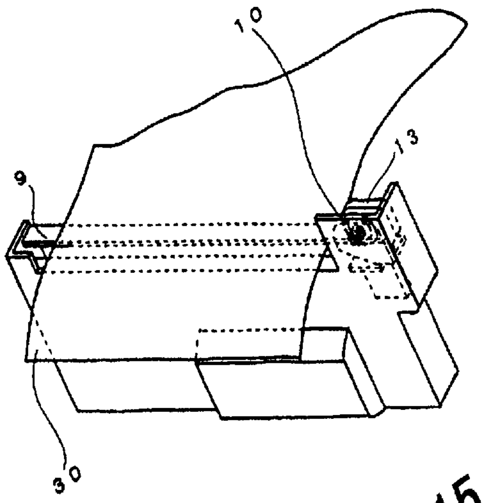
FIGS. 14 and 15 are perspective views for explaining cutting operation.

In operation, a paper sheet 30 printed in the printer 1 (FIG. 1) is discharged from the paper discharge opening 4 and stopped at a predetermined position as shown in FIG. 14. A control circuit (not shown) operates the motor 19 (FIG. 8) in response to the discharge of the paper, so that the first pulley 14 is rotated in the clockwise direction in FIGS. 8 and 10 to drive the carrier feeding belt 16.

The movable cutter carrier 13 positioned at the home position is moved together with the belt 16 by the engagement of the projection 17*b* of the connecting member 17 with the vertical hole 13*a*. In an initial period of the rotations of the first pulley 14, the projection 17*b* slides in the hole 13*a* and feeds the carrier 13.

The movement of the carrier 13 causes the movable cutter rotating roller 28 to roll on the fixed cutter 9 to rotate the movable cutter 10. Thus, the paper sheet 30 is cut by the cutters 9 and 10.

Figure 15:
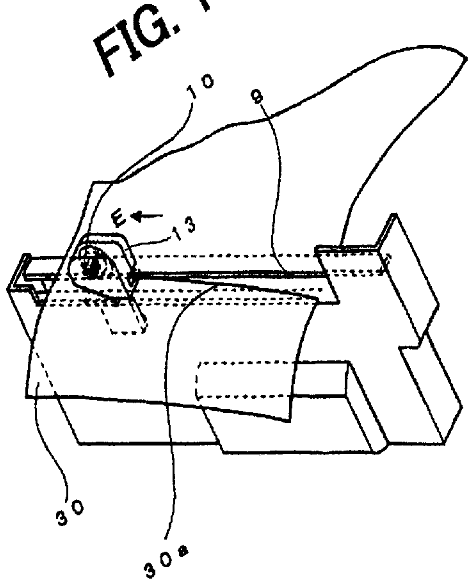
Figure 16:
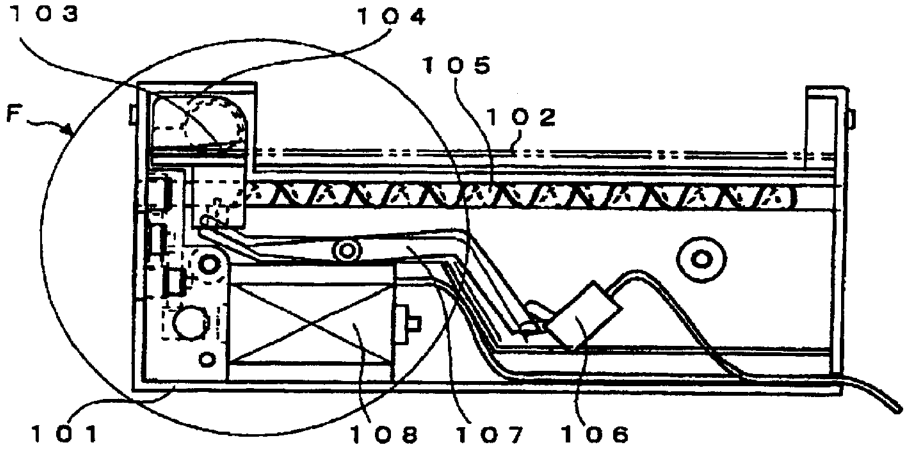
FIG. 16 PRIOR ART
FIG. 16 is a front view of a conventional paper cutting device.
Figure 17:
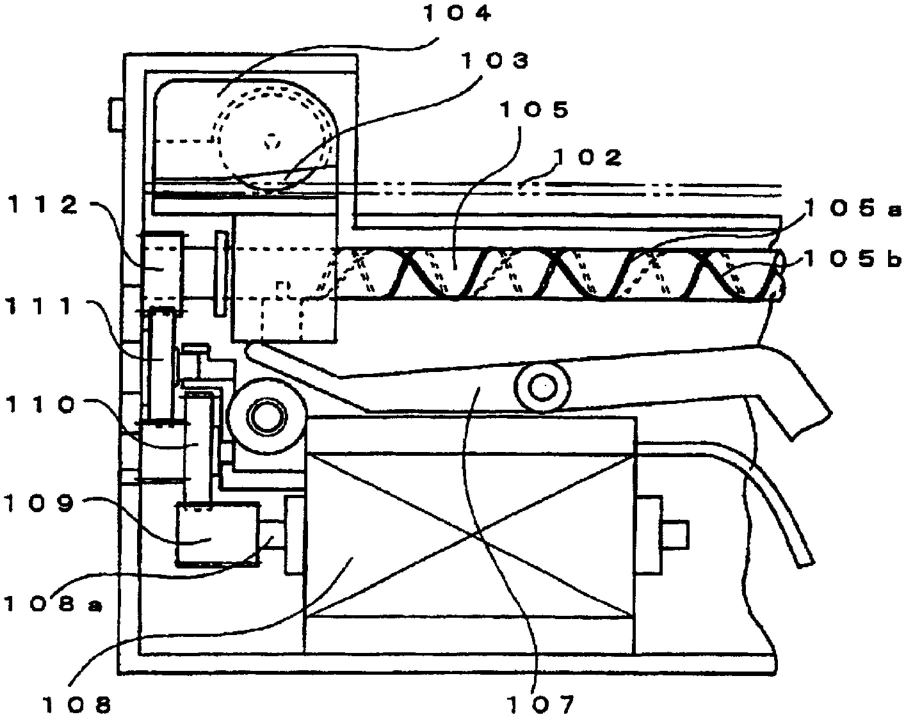
FIG. 17 PRIOR ART
FIG. 17 is an enlarged view of a part F of FIG. 16.

Referring to FIG. 15, the carrier 13 is moved in the direction of an arrow E. After the cutting of the paper 30, the motor 19 continues to rotate, so that the carrier 13 is moved in the reverse direction to the arrow E. When the carrier 13 reaches the home position, the carrier 13 operates the sensor 18 (FIG. 8) to generate a home position signal. In response to the signal, the control circuit stops the motor 19. Thus, the cutting operation finishes.

In accordance with the present invention, the movable cutter carrier is reciprocated by the carrier feeding endless belt. Therefore, the friction resistance between the carrier and the driving belt is very small, so that the load on the carrier feeding motor is reduced, and the device can be manufactured at a low cost.

While the invention has been described in conjunction with preferred specific embodiment thereof, it will be understood that this description is intended to illustrate and not limit the scope of the invention, which is defined by the following claims.

What is claimed is:

1. A paper cutting device comprising:

a frame (11);

a straight fixed cutter (9 ) mounted on the frame;

a movable cutter carrier (13) slidably supported on the frame to be moved along the fixed cutter;

a movable cutter (10) having a disc shape and rotatably mounted on the carrier, and contacted with the fixed cutter at a side surface thereof;

a movable cutter rotating roller (28) rotatably mounted on the movable cutter carrier and resiliently contacted with the movable cutter at a side surface thereof and with the fixed cutter;

a carrier feeding endless belt (16) provided in the frame along the fixed cutter, the belt comprising an inside surface having teeth and a peripheral surface without teeth; a fixing projection (16*a*) integrally formed on the belt;

a carrier connecting cylindrical member (17) having a recess (17*c*) extending in a radial direction and engaged with the fixing projection (16*a*);

a pair of recesses (16*b*) formed on the fixing projection (16*a*) and a pair of projections (17*a*) provided on the carrier connecting cylindrical member (17) and engaged with the recesses (16*b*), thereby locking the carrier connecting cylindrical member (17) to the projection with respect to the radial direction;

a belt driving motor;

a cylindrical projection (17*b*) projected from the carrier connecting cylindrical member (17) and slidably engaged with a vertical elongated hole (13*a*) formed in the movable cutter carrier, thereby connecting the movable cutter carrier with the endless belt;

a power transmitting device for transmitting the power of the motor to the endless belt for driving the endless belt, whereby the movable cutter carrier is moved by the endless belt, and the movable cutter is rotated along the fixed cutter so as to cut a paper sheet mounted on the fixed cutter, and the movable cutter carrier is returned to a home position after the cutting of the paper, wherein the fixing projection (16*a*) is formed on the outer peripheral surface of the belt, and the cylindrical projection (17*b*) is projected in the sideward direction of the belt.

2. The device according to claim 1 further comprising a shaft mounted on the movable cutter carrier, a movable cutter cylindrical holder mounted on the shaft, and a holding member mounted on the movable cutter cylindrical holder, the movable cutter rotating roller being mounted on the holding member.

3. The device according to claim 1 further comprising a fixing projection formed on a peripheral portion of the belt for connecting the carrier with the belt.

4. The device according to claim 2 wherein the movable cutter rotating roller urges the movable cutter to a flange formed on the movable cutter cylindrical holder to hold the movable cutter.

5. The device according to claim 3 wherein the carrier connecting member has a cylindrical projection slidably engaged with a vertical elongated hole formed in the movable cutter carrier, and engaged with the fixing projection on the belt.

6. The device according to claim 4 further comprising a spring provided between an inside wall of the carrier and the movable cutter cylindrical holder for pressing the movable cutter against the fixed cutter.

* * * * *